United States Patent [19]

Mayer et al.

[11] Patent Number: 5,713,098
[45] Date of Patent: Feb. 3, 1998

[54] WIPER SYSTEM

[75] Inventors: Gunter Mayer, Tamm; Wolfgang Scholl, Gemmrigheim, both of Germany

[73] Assignee: ITT Automotive Europe GmbH, Germany

[21] Appl. No.: 416,695

[22] PCT Filed: Sep. 20, 1993

[86] PCT No.: PCT/EP93/02545

§ 371 Date: May 15, 1995

§ 102(e) Date: May 15, 1995

[87] PCT Pub. No.: WO94/08827

PCT Pub. Date: Apr. 28, 1994

[30] Foreign Application Priority Data

Oct. 10, 1992 [DE] Germany .......................... 42 34 202.3

[51] Int. Cl.$^6$ .................... B60S 1/44; B60S 1/20
[52] U.S. Cl. ................... 15/250.24; 15/250.29; 74/37; 74/27; 254/390; 254/389
[58] Field of Search ............... 15/250.24, 250.29, 15/250.3, 103; 74/37, 27; 254/389, 390, 393, 394, 399

[56] References Cited

U.S. PATENT DOCUMENTS

| 1,497,406 | 6/1924 | Robertson | 15/250.24 |
| 1,720,832 | 7/1929 | Gibson | 15/250.24 |
| 1,748,055 | 2/1930 | Brown et al. | 15/250.24 |
| 2,063,055 | 12/1936 | Shaw | 15/250.24 |
| 3,042,954 | 7/1962 | Wynn et al. | 15/250.24 |
| 3,354,494 | 11/1967 | Rischman | 15/250.24 |
| 5,179,758 | 1/1993 | Smith et al. | 15/250.24 |

FOREIGN PATENT DOCUMENTS

| 613606 | 11/1926 | France | 15/250.24 |
| 1015830 | 10/1952 | France | . |
| 2308484 | 10/1973 | Germany | 15/250.29 |
| 2430831 | 1/1976 | Germany | 15/250.24 |
| 2919240 | 12/1980 | Germany | . |

Primary Examiner—Gary K. Graham
Attorney, Agent, or Firm—J. Gordon Lewis; Thomas N. Twomey

[57] ABSTRACT

A system for cleaning light transmitting elements such as windscreens, window-panes or optical instruments, comprising a wiper arm supported by a carriage performing reciprocating movements, and a intermediate gear means for transforming rotary movements into oscillating movements, with the intermediate gear means cooperating with a driving means and actuating the carriage and, on the driven side, being in communication with a shaft performing oscillating movements. The shaft is the driving part of a transmission gear means for oscillating movements. The part of the transmission gear means performing movements on the driven side actuates the carriage through a tensile and/or thrust member.

18 Claims, 6 Drawing Sheets

WIPER SYSTEM

TECHNICAL FIELD

This invention generally relates to wiping systems and more particularly relates to a system for cleaning a light transmitting elements such as windscreens, window-panes or optical instruments.

BACKGROUND OF THE INVENTION

Arrangements of the afore-mentioned type are known in the art and are made up as a system of rods and gears insuring linear reciprocating movements of a carriage which carries a wiper element across a light transmitting element. It is considered to be a substantial disadvantage involved with prior art arrangements that in view of the complex design of linear wiper systems of this type, the carriage exhibits an unfavorable sequence of movements as the speed thereof is substantially constant and in the area of reversing of the direction of movement is abruptly changed. Such jerky movements of the carriage occurring in the end areas of the carriage result in substantial load on the entire driving mechanism and, hence dictate a more rugged design of the arrangement. The abrupt changes in speed of the carriage cause vibrations to the item to be cleaned, which is undesirable.

Based on the afore-described state of art it is an object of the present invention to overcome this disadvantage and to so develop a system of the afore-described type as to improve the sequence of movements of the carriage in such a way that the speed thereof in the area of the points of directional change is minimized.

The invention takes advantage of the fact that the sequence of movements of a part of the transmission gear performing movements on the driven side, comes very close to a sinusoidal function so that the speed of the carriage in the area of the points of directional charge is approximately zero. This will result in a minimum load on all components of the system, and, in particular, in a smooth sequence of movements of the carriage.

According to a particularly advantageous measure of the invention the part performing movements on the driven side is a section of a hollow cylinder arranged on the shaft and formed as a housing. In this respect it is advantageous for the housing to have a hub provided with an outer gear and arranged within the interior of the transmission gear, extending in coaxial relationship with the axis of the shaft. The invention thereby provides a transmission gear the housing of which (i.e. the part performing movements on the driven side) simultaneously carries out two functions. On the one hand, the parts required for the transmission are protected so that the outer mechanical influences exerted on the transmission gear can substantially be prevented from occurring; on the other hand, the housing performs the function of an element directly cooperating with the tensile and/or thrust member.

According to another advantageous embodiment of the invention at least one toothed gear rotatable about a stationary axis is in engagement with the outer gear of the hub is arranged within the housing (and with a gear connected to the shaft in a non-rotating manner). According to the principle of the invention it is particularly advantageous to provide three gears in engagement with the outer gear of the hub and the toothed gear of the shaft, it being also possible for the toothed gears to be supported by cylindrical pins. The latter as well as the shaft are supported by the mounting frame.

According to another embodiment of the present invention the radial outer side of the housing comprises thread-type grooves in cooperation with the tensile element formed as a cable or belt, thereby establishing a frictional communication between the housing and the cable or belt.

In order to provide a simple and low-cost manufacture of the system, it is advantageous for the mounting frame to carry the driving means, the gear and the transmission gear and to comprise a guiding rod for the carriage extending in the direction of movement of the carriage. The mounting frame can be in the form of a punched or cast element carrying the individual components of the system and is readily mountable. The axial ends of the guiding rod can carry pulleys for the tensile member.

To insure a proper sequence of movements of the carriage another advantageous embodiment of the invention provides that the guiding rod comprises bearing faces for the idlers of the carriage. To insure non-rotatability of the carriage about the rod another advantageous embodiment of the invention provides that the bearing surfaces, in cross-section, are of a concave design and are formed on the sides of the guiding rod facing away from one another.

The fact that the guiding rod is bent to conform to the outer contour of the windscreen will safeguard that the wiper arm can readily follow the contours of the windscreen.

The provision on the guiding rod, in addition, can be further simplified in that the guiding rod is formed of a hollow profile section the ends of which are sealed. In this respect, it is advantageous for the carriage to comprise at least two, preferably, three idlers, with at least one of the idlers rolling along one of the bearing surfaces, and the other idlers rolling along the second bearing surface.

For the proper operation of the system it is critical that the tensile and/or thrust member be permanently in cooperation with the transmission gear. Preferably the carriage comprises a clamping device connected to the tensile member, thereby enabling the clamping force of the tensile member to be adjusted.

DETAILED DESCRIPTION OF THE PREFERRED EMBODIMENTS

Figure 1:
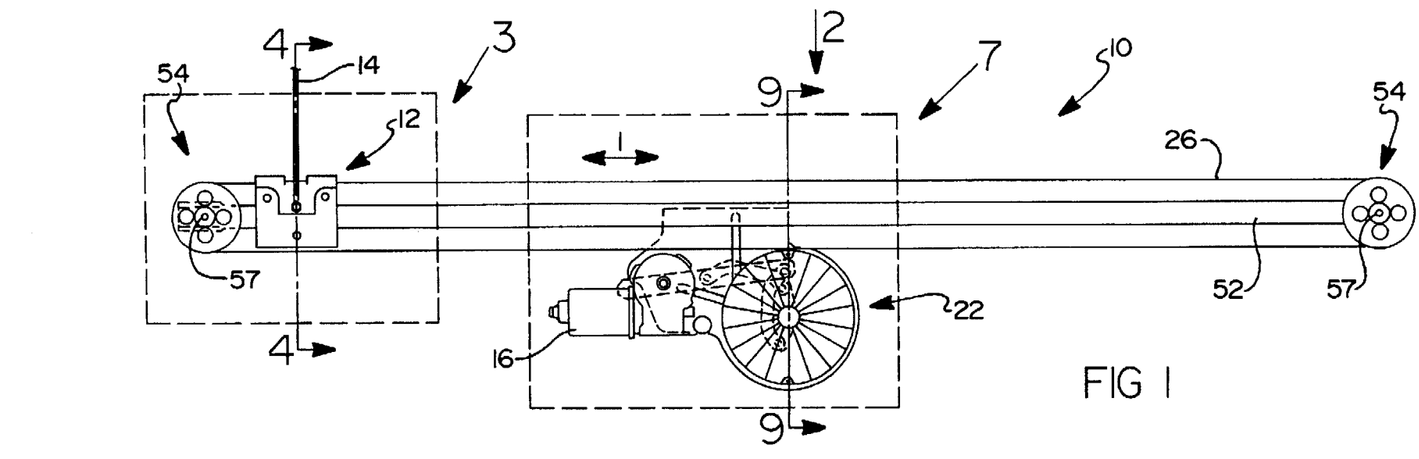
FIG. 1 is a side view of the system according to the present invention.
Figure 2:
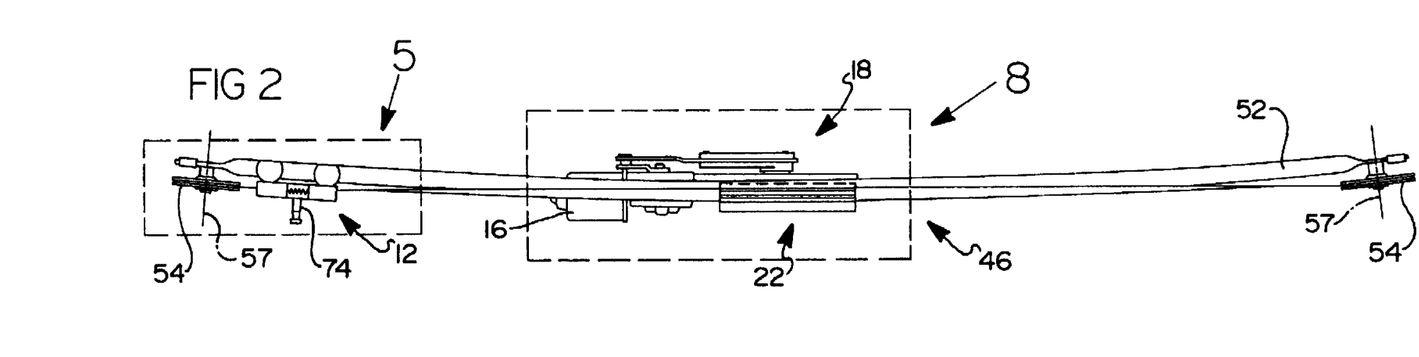
FIG. 2 shows the system as illustrated in FIG. 1 in the direction of flash II.
Figure 3:
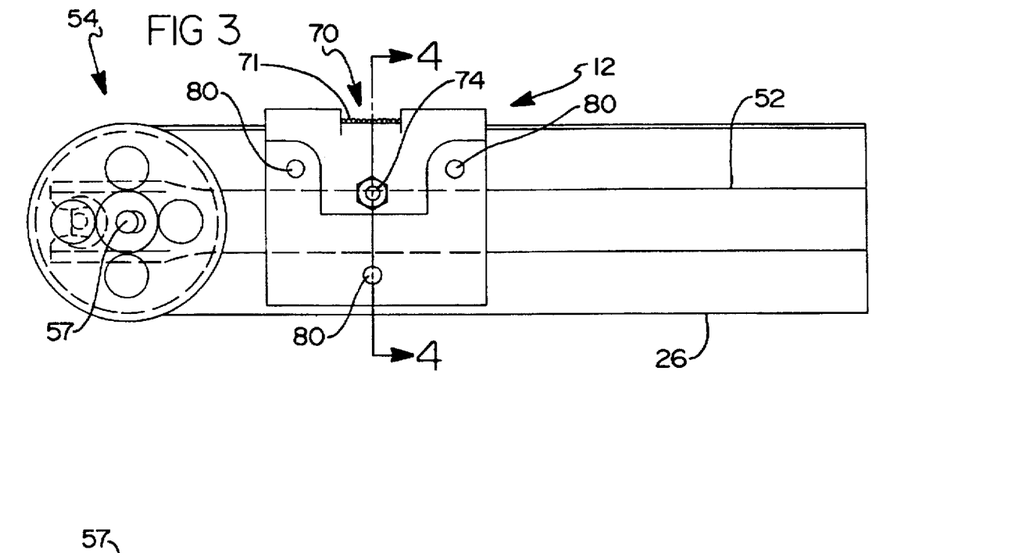
FIG. 3 shows the part designated by III in FIG. 1, on an enlarged scale.

FIGS. 1 and 2 in connection with FIGS. 3–9 show an system 10 or parts thereof for cleaning light transmitting means such as windscreens, window-panes or optical instruments. The system 10 operating as a linear wiper system comprises a wiper arm 14 supported by a carriage 12 performing reciprocating movements, as well as a intermediate linkage means 18 for transforming rotary movements into oscillating movements. Intermediate linkage means 18 cooperates with a driving means 16 and actuates the carriage 12, with the gear on the driven side being in communication with a shaft 20 performing oscillating movements. The shaft 20 is the driving part of a transmission gear means 22 for providing oscillating movements. The part 24 of the gear means 22 performing movements on the driven side actuates the carriage 12 through a tensile and/or thrust member 26.

Figure 9:
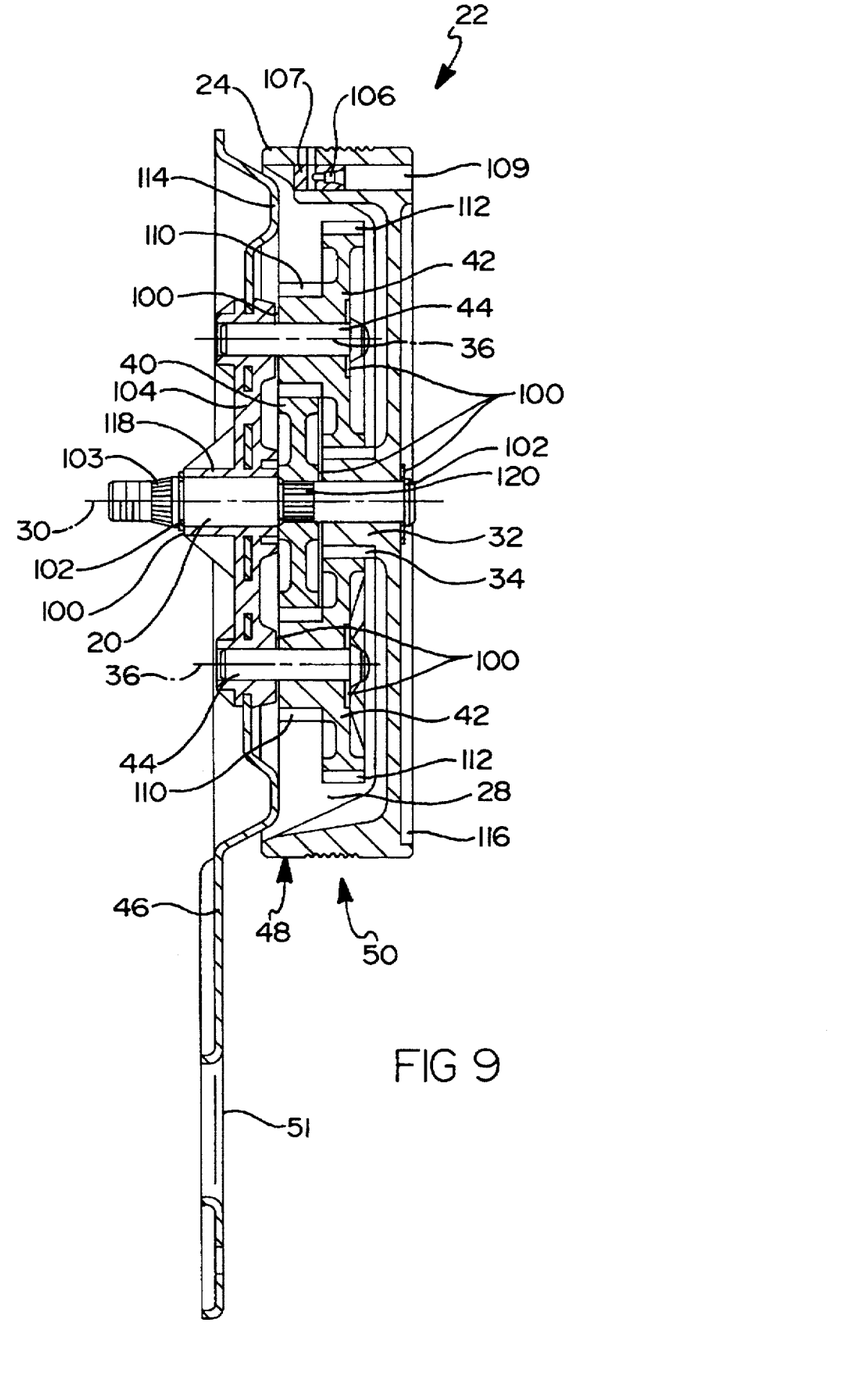
FIG. 9 is a sectional view alone the line IX—IX according to FIG. 7.

FIG. 9 conveys that the part 24 performing movements on the driven side is a section of a hollow cylinder arranged on the shaft 20 and formed as a housing. The housing 24 comprises a hub 32 with an outer gear 34, disposed in the interior 28 of the transmission gear means 22 and extending in coaxial relationship with the axis 30 of the shaft 20, and on the outer side is provided with a depression 116. Additionally disposed in the housing 24 are three toothed gears 42 each rotatable about a stationary axis 36 and each being in engagement with the outer gear 34 of the hub 32 and with a toothed shaft gear 40 connected in non-rotating manner to the shaft 20 through a corrugated part.

The toothed gears 42 are carried by stationary cylindrical pins 44 and are made up of respectively one big pinion 112 and one small pinion 110 defining the transmission ratio of the gear. The adjustability of the transmission gear means 22 relative to the carriage 12 is, of course, determined by the outer diameter of the housing 24 of circular cross-section. Moreover, FIGS. 1 and 9 convey that a mounting frame 46 is provided carrying the cylindrical pins 44, the shaft 20, the driving means 16, the intermediate linkage means 18 and the transmission gear means 22, and comprising a guiding rod 52 for the carriage 12 extending in the direction of movement 1 of the carriage 12, as well as a means 51 for accommodating a reduction gear means. The axial ends of the guiding rod 52 each comprise a pulley 54 for carrying the tensile element 26 shown as a cable.

Figure 4:
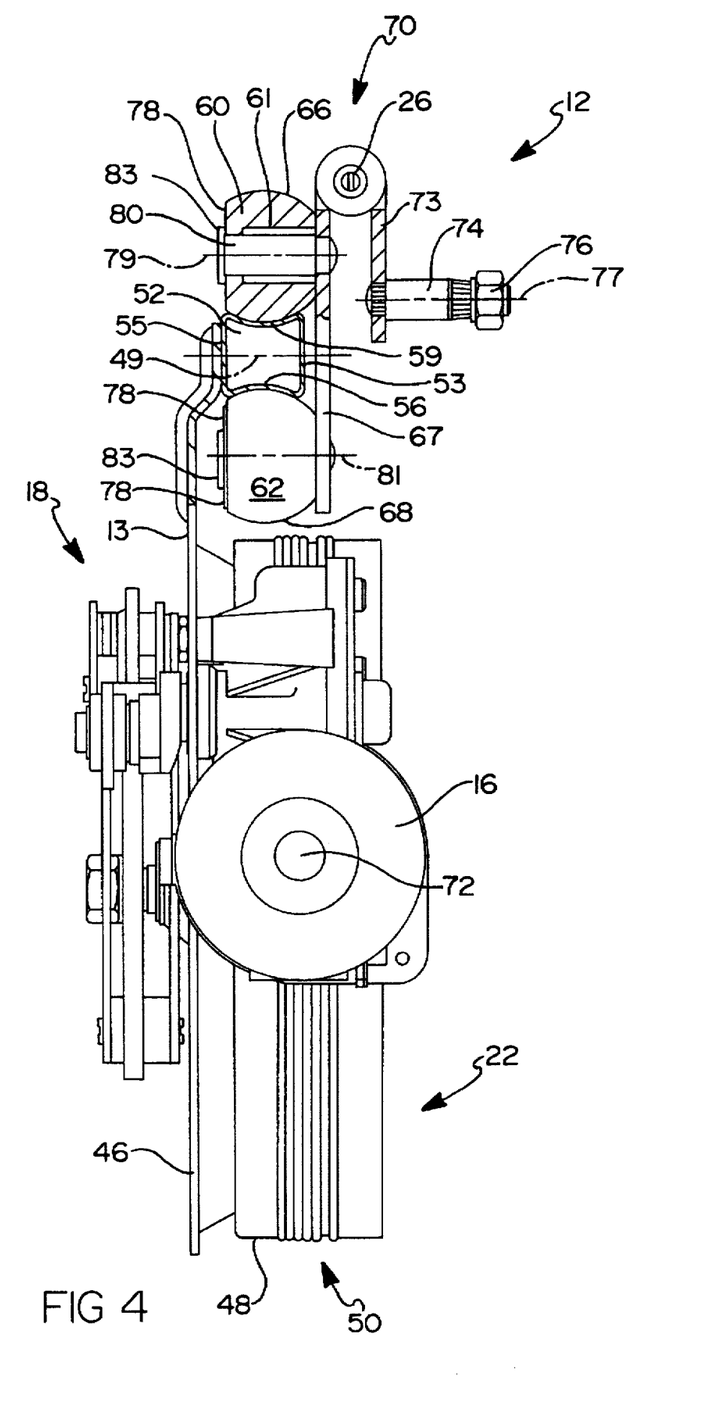
FIG. 4 is a sectional view alone line IV—IV according to FIG. 1, on an enlarged scale.

FIGS. 4 and 9 show that the radial outer side 48 of the housing 24 is provided with screw-type grooves 50 cooperating with the cable 20.

Figure 5:
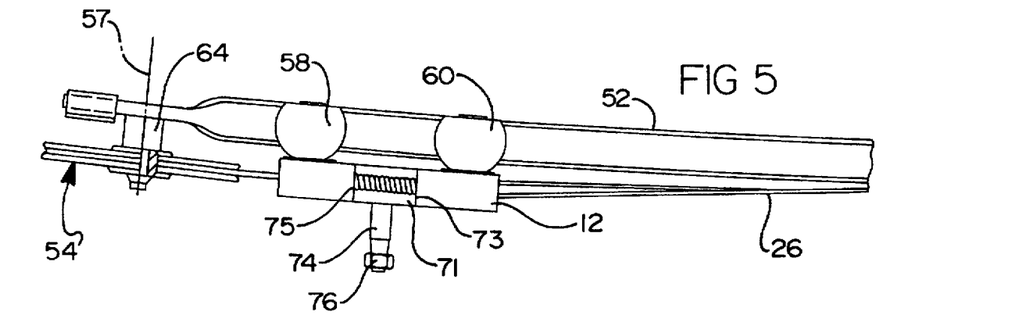
FIG. 5 shows the part designated by V according to FIG. 2, on an enlarged scale.
Figure 6:
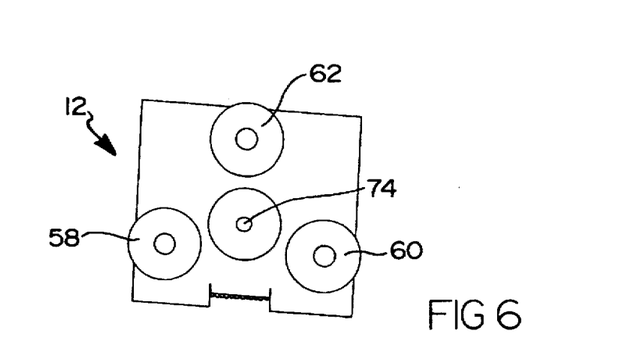
FIG. 6 shows the carriage as illustrated in FIG. 1 viewed from the other side thereof.
Figure 7:
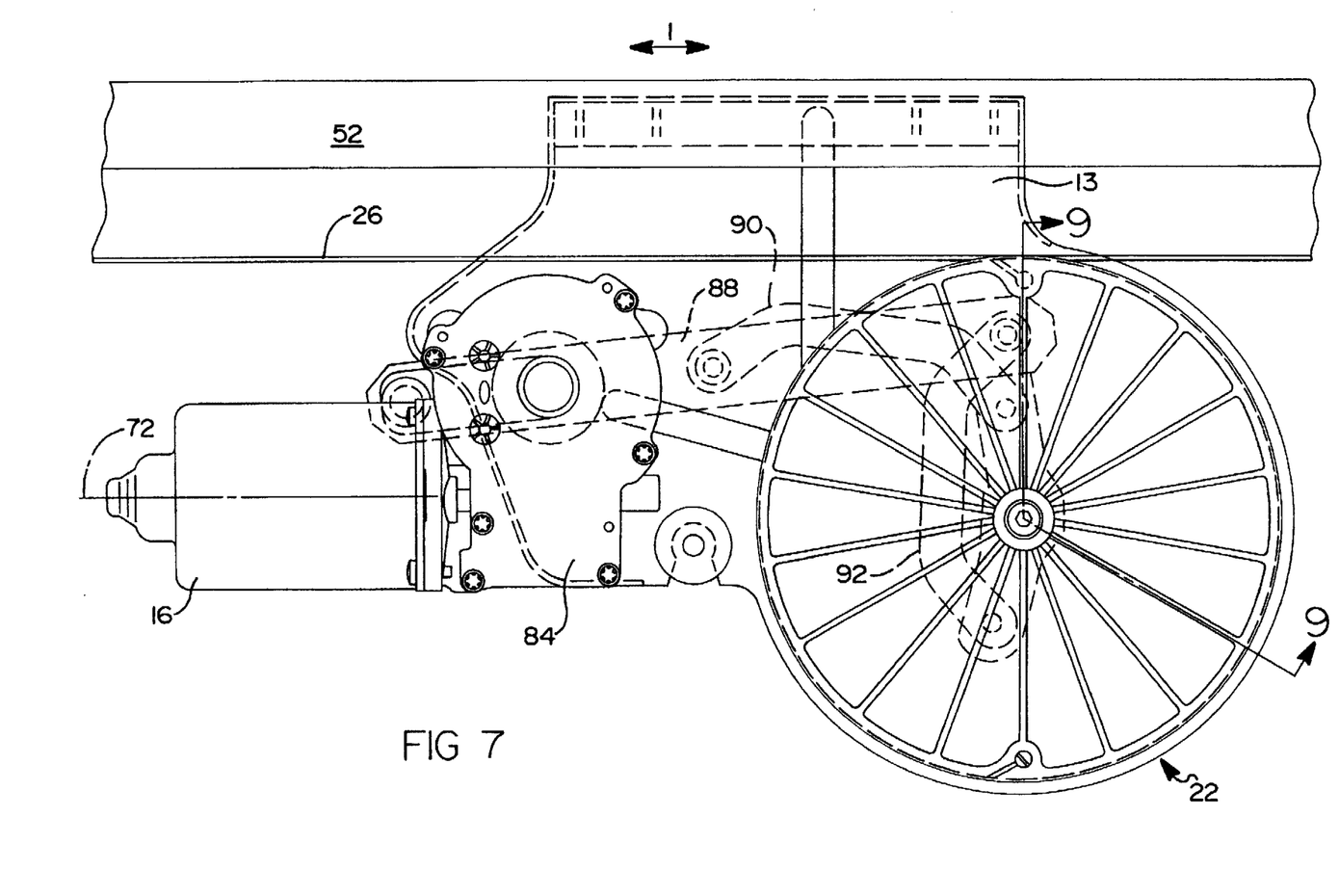
FIG. 7 shows, on an enlarged scale, part VII of FIG. 1.
Figure 8:
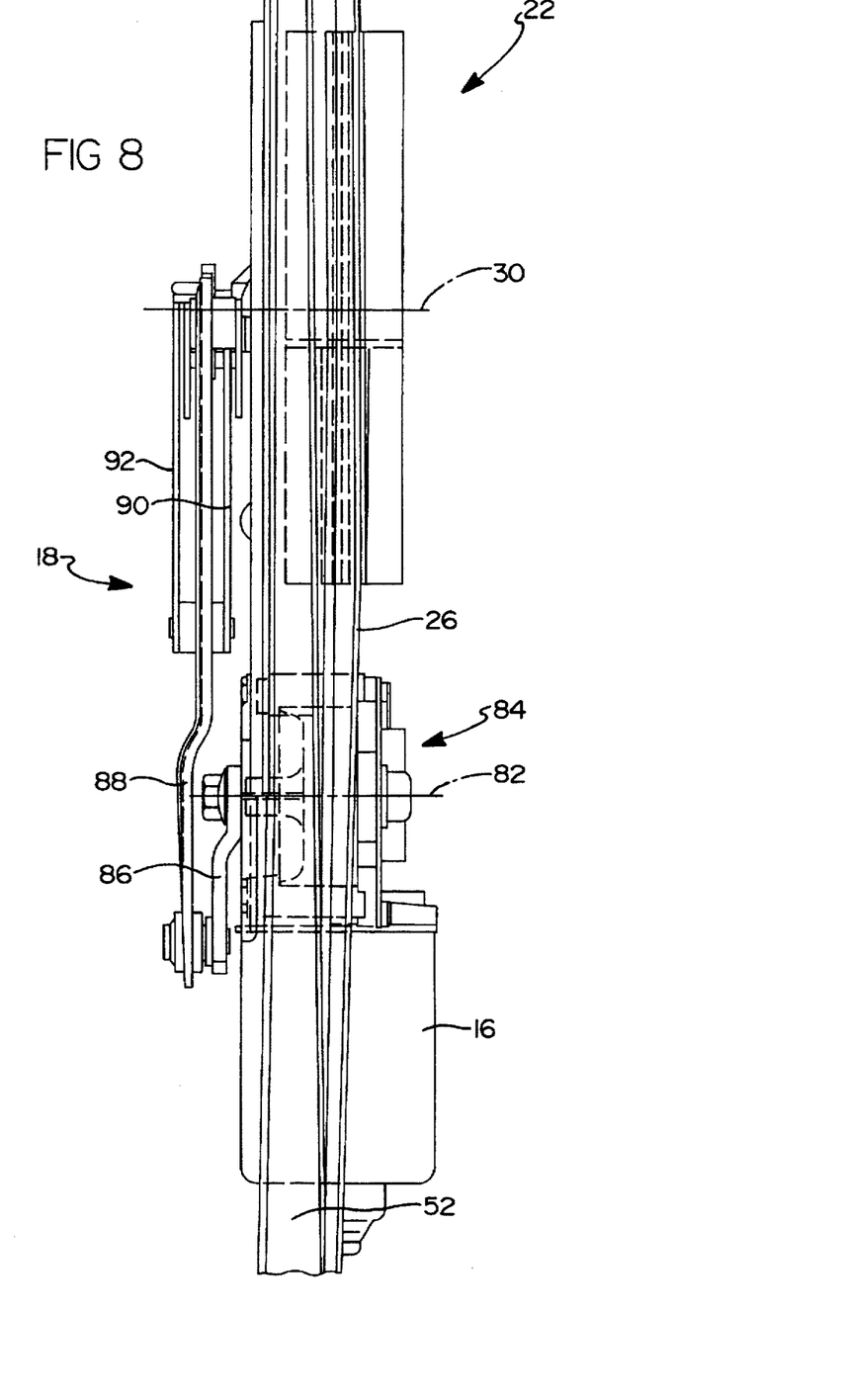
FIG. 8 shows the part designated by VIII according to FIG. 2, on an enlarged scale.

FIGS. 1, 4 and 5 disclose that the guiding rod 52 comprises bearing surfaces 59 and 56 for supporting the idlers 58, 60 and 62 of the carriage 12. The bearing surfaces 59 and 56, in cross-section, are of a concave configuration and are formed on the sides of the guiding rod 52 facing away from one another.

As especially revealed by FIGS. 2 and 5, the guiding rod 52 is bent to conform to the outer contour of a windscreen (not shown in any closer detail) with the guiding rod 52 being formed of a hollow profile section the ends of which are sealed.

FIGS. 3 to 6 show that the carriage 12 comprises three idlers 58, 60, 62 of which idler 62 rolls along the bearing surface 56 while the idlers 58 and 60 roll along the bearing surface 59. The rolling faces 66 and 68 of the idlers 60 and 62, in cross-section, are of a convex configuration and are complementary to the bearing surfaces 59 and 55. The idlers 60, 62 comprise bearing sleeves 61 of bearing material carried by the pins 80 having heads 83. The axes 79, 81 of the pins extend in a direction vertical to the long leg 67 of the carriage 12. The short leg 73 extending in parallel to the long leg 67 carries the bolt 74 with nut 76 for the wiper arm. The axis 77 thereof extends approximately in parallel to the axes 79, 81. The central longitudinal axis 49 of the guiding rod 52 is of an arcuate configuration, which also applies to walls 53, 55 of the guiding rod.

The mounting frame 46 is preferably a punched or cast part including a guiding rod 52 extending in the direction of movement 1 of the carriage 12. Disposed in the central area of the mounting frame 46 and below the guiding rod 52 are the driving means 16 formed as an electromotor and provided with the reduction gear means 84, and the intermediate linkage means 18 as well as the transmission gear means 22. These parts of the system are carried by an apron 13 extending downwardly. The latter-mentioned parts of the system are connected to the apron by means of nuts, rivets or the like. The rotor of the motor 16 not shown in any closer detail rotates about an axis 72 extending approximately in parallel to the direction of movement 1 of the carriage, yet in a direction perpendicular to the axis 30 of the shaft 20. Because the speed of the motor 16, as a rule, is excessively high the reduction gear means 84 is provided between the motor 16 and the intermediate 18. The intermediate linkage means 18 is actuated by a crank rod 86 of the reduction intermediate means 84 intermediate linkage means rotating about the axis 82. The gear 18 is made up of rods 88, 90 and 92 transforming the rotary movements of the crank rod 86 into swivable movements of the shaft 20.

Providing the transmission gear means 22 between the intermediate gear means 18 and the cable 26 results in that the swivelling movements of the shaft are transformed into oscillating movements of the housing 24. Depending on the design of the toothed gears 40 and 42 and on the ratio prevailing between the gears, the toothed shaft gear 40 and the outer gear 34, the housing 24 performs multiple rotary movements in one and in the other direction, respectively. It is, of course, also possible to modify the toothed gears 40, 42 and 34 as to vary the ratio. The toothed gears 40, 42 and the housing 24 can be made of injection-moulded plastic parts or metal. The mounting frame 46 in the area of the transmission gear means 22 is provided with a recess into which can be introduced the support member 104 along with the holding tube 118 of the transmission gear means 22, filling up the said recesses in a form-locking way. The cylindrical pins 44 are rigidly connected to the support member 104 while the shaft 20 is rotatably connected thereto. To avoid axial misadjustments of the shaft 20, disks 100 and locking rings 102 are detachably connected to the shaft 50. A non-rotting connection between the shaft 20 and the intermediate linkage means 18 is insured in that the end facing the intermediate linkage means 18 is provided with a corrugated portion 103. The rigidity of the support member 104 in the area of the transmission gear means 22 is insured in that the mounting frame 46 in that area is of a non-planar configuration as shown by the annular depression 114 protruding into the interior 28.

Once the motor 16 is actuated, the rotating movements of the rotor thereof are transmitted through the reduction gear means 84 to the gear 18 which exerts swivel movements on the shaft 20.

The swivel movements of the shaft 20 are transmitted through toothed gears 40, 42 and 34 to the housing 24 performing several revolutions in clockwise direction and, subsequently, performing the same number of revolutions in counter clockwise direction. As the cable 26 is connected in a non-skid way to the housing 24 and is held by means of a clamping screw 106 (disposed in a bore 109 with thread and thrust member 107) it is reciprocated (as shown by 1 in FIG. 7) thereby also driving the carriage 12 with the wiper arm 14. The speed of the carriage 12 is not constant within the range of adjustment. The maximum speed reaches the carriage approximately in the central area between the two pulleys 54, while it gradually decreases in the end areas (see FIGS. 1 and 2) until the zero value is reached. Thereafter, the carriage 12 moves in the opposite direction, increasing in speed. After reaching the maximum speed, i.e. once the carriage 12 is arranged approximately in the area of the transmission intermediate gear means 22, the speed thereof decreases again until the turning point is reached where the speed is zero. The reciprocating movements are repeated as long as the electromotor is actuated.

The wiper arm 14 is arranged in a direction approximately vertical to the guiding rod 52 and is supported by the bolt 74. Due to the arrangement of the idlers 58, 60 and 62 in communication with the pins 80 through locking disks 78, a proper sequence of movements of the carriage 12 is insured. As the cable 26 during movement of the carriage 12 is exposed to substantial load, it must be tensioned if so required, for which reason the clamping means 70 with a retainer 71 is provided which is supported on elements 73, 75.

In conclusion, FIG. 5 discloses that the pulleys 54 are in communication with the guiding rod 52 through a sleeve 64, and are arranged in side-by-side relationship with the guiding rod 52. The axes 57 of the pulleys 54 do, therefore, not extend in parallel with respect to one another.

We claim:

1. A wiper system comprising:

a wiper arm for supporting a wiper element, said arm supported by a carriage, said carriage being coupled to a tensile member, a driving means comprising a primary shaft actuable in only one direction of rotation, the primary shaft of the driving means being connected to a transforming linkage means, said transforming linkage means transforming rotary movements of the primary shaft into swiveling movements of a secondary shaft connected to the transforming linkage means, and a transmission gear means actuated by said secondary shaft to transform the swiveling movements of said secondary shaft into oscillating movements, with a driven member of said transmission gear means performing the oscillating movements and coupled to said tensile member for reciprocating said carriage, and thus reciprocating said wiper over a windscreen, wherein the driven member is a section of a hollow cylinder disposed on the secondary shaft and formed as a housing.

2. The system according to claim 1, wherein the housing includes a hub having an outer tooth gear arranged in the interior of the housing said outer tooth gear extending in coaxial relationship with an axis of the secondary shaft.

3. The system according to claim 1, wherein at least one toothed gear is arranged in the housing and is rotatable about a stationary axis and in engagement with a that lead shaft gear connected to the secondary shaft in a non-rotating way.

4. The system according to claim 3, wherein three toothed gears are provided that are in engagement with the outer gear and the toothed shaft gear.

5. The system according to claim 4, wherein the toothed gears are supported by cylindrical pins.

6. The system according to claim 5, further including a mounting frame, the cylindrical pins and the secondary shaft being carried by the mounting frame.

7. The system according to claim 6, wherein the mounting frame supports the driving means, the transforming linkage means and the transmission gear means, and comprises a guiding rod for the carriage, extending in the direction of movement of the carriage.

8. The system according to claim 7, wherein the guiding rod comprises bearing faces for idlers of the carriage.

9. The system according to claim 8, wherein the bearing faces, in cross-section, are of a concave configuration and are formed on sides of the guiding rod facing away from one another.

10. The system according to claim 8, wherein the carriage comprises first and second idler rollers, said first idler roller adapted to roll along a first bearing face while the second idler rolls along a second bearing face.

11. The system according to claim 10, wherein rolling faces of the idlers, in cross-section, are of a convex configuration and are complementary to the bearing faces.

12. The system according to claim 8, wherein the carriage comprises three idlers of which at least one idler rolls along a first bearing face while the other idlers roll along a second bearing face.

13. The system according to claim 7, wherein axial ends of the guiding rod support pulleys for the tensile member.

14. The system according to claim 7, wherein the guiding rod is bent to conform to the outer contour of the windscreen.

15. The system according to claim 7, wherein the guiding rod is formed of a hollow profile section ends of which are sealed.

16. The system according to claim 1, wherein a radial outer side of the housing comprises grooves adapted to engage the tensile member.

17. The system according to claim 1, wherein said driving means includes an electromotor with said primary shaft, said primary shaft being connected to said transforming linkage means through a reduction gear means, said reduction gear means comprising a crank rod.

18. The system according to claim 17, wherein the transforming linkage means comprises a connecting rod which on one end is connected to said crank rod and on another end is connected to the secondary shaft of the transmission gear means through a multi-link arrangement.

* * * * *

UNITED STATES PATENT AND TRADEMARK OFFICE
CERTIFICATE OF CORRECTION

PATENT NO. : 5,713,098
DATED : Feb. 3, 1998
INVENTOR(S) : Gunter Mayer; Wolfgang Scholl It is certified that error appears in the above-indentified patent and that said Letters Patent is hereby corrected as shown below:

Column 5, line 53, delete "a that lead" and replace therefor --the toothed--.

Signed and Sealed this

Fifth Day of May, 1998

*Attest:*

BRUCE LEHMAN

*Attesting Officer*     *Commissioner of Patents and Trademarks*